(12) United States Patent
Fu et al.

(10) Patent No.: US 7,185,590 B2
(45) Date of Patent: Mar. 6, 2007

(54) PLANAR MAGLEV POSITIONING SYSTEM

(75) Inventors: Li Chen Fu, Taipei (TW); Mei Yung Chen, Taipei (TW); Tzuo Bo Lin, Taipei (TW)

(73) Assignee: National Taiwan University, Taipei (TW)

( * ) Notice: Subject to any disclaimer, the term of this patent is extended or adjusted under 35 U.S.C. 154(b) by 0 days.

(21) Appl. No.: 10/794,050

(22) Filed: Mar. 8, 2004

(65) Prior Publication Data

US 2005/0193920 A1    Sep. 8, 2005

(51) Int. Cl.
*B60L 13/04* (2006.01)
*H02K 7/09* (2006.01)

(52) U.S. Cl. ..................... 104/281; 310/90.5
(58) Field of Classification Search ............... 104/281, 104/282, 283, 286; 310/40 R, 46, 90.5
See application file for complete search history.

(56) References Cited

U.S. PATENT DOCUMENTS

| | | | | |
|---|---|---|---|---|
| 5,218,257 | A * | 6/1993 | Tozoni | 310/90.5 |
| 5,319,275 | A * | 6/1994 | Tozoni | 310/90.5 |
| 5,652,472 | A * | 7/1997 | Tozoni | 310/90.5 |

OTHER PUBLICATIONS

Kim et al., High-Precision Control of a Maglev Linear Actuator with Nanopositioning Capability, 2002 AACC/Proceedings of the American Control Conference, p. 4279-4284.

Jung et al., Study on a Novel Contact-Free Planar System Using Direct Drive DC Coil and Permanent Magnets, 2002 IEEE/ASME transactions on Mechatronics, vol. 7, No. 2, p. 35-43.

Kim et al., Modeling and Vector Control of Planar Magnetic Levitator, 1998 IEEE, vol. 34, No. 6, p. 1254-1262.

\* cited by examiner

*Primary Examiner*—S. Joseph Morano
*Assistant Examiner*—Robert J. McCarry, Jr.
(74) *Attorney, Agent, or Firm*—Birch, Stewart, Kolasch, & Birch, LLP

(57) ABSTRACT

A six-degree-of-freedom magnetic levitation positioning system includes a levitated platform, six impelling coils disposed adjacent to the platform, and six permanent magnets attached to the platform such that each of the permanent magnets is adjacent to and magnetically aligned with a respective one of the impelling coils, whereby there are six magnet-coil sets. Among the six sets, three of the sets are maglev sets in which magnetic axes of the impelling coils are generally vertically aligned, and another three of the sets are horizontal impelling sets in which magnetic axes of the impelling coils are generally horizontally aligned. The magnetic axes of the three horizontal impelling sets are all mutually non-parallel, so that elevation and tiltings of the platform can be actuated by adjusting the currents in coils of the three maglev sets, and translations and rotations about a vertical axis of the platform can be actuated by adjusting the currents in coils of the three horizontal impelling sets. Thus, motion in every degree of freedom (three rotations and three translations) is possible.

4 Claims, 5 Drawing Sheets

PLANAR MAGLEV POSITIONING SYSTEM

FIELD OF THE INVENTION

The present invention relates to a planar positioning system, and more particularly to an improved structure of a planar positioning system having maglev positioning system thereon.

BACKGROUND OF THE INVENTION

In recent years, precision machining technologies and precision servo control technologies play vast important rules with the rapid growth of the computer information and electrics industries. Traditionally, DC or AC servo motors operated with screws are applied in most precision positioning systems to achieve the purpose of precision positioning. For example, by using piezoelectric actuator at 10 micrometer motion distance which can reach high precision of 10 nanometers (nm), and the piezoelectric actuator can also meet a rapid reacting request. However, the superior limit of piezoelectric actuator is the moving range. It can not be used if there needs a larger moving range condition. In order to meet the long distant request, most of them utilize server motor with screw bar or directly utilize linear motors in tradition. Nonetheless, it renders the whole positioning precision down because of backlash of screw bar and friction of bearings. Linear motors also influenced by the ripple and end effect which reduce the positioning precision.

In general, a method to solve said friction is not only strengthening the manufacture precision of the system hardware, but also lubricating oil which can reduce the friction. Furthermore, it utilizes many kind of ways to estimate the friction under controlling principle and utilizes reverse force to against the friction effect.

In millimicron semiconductor fabricating process, it has reached certain level of technology level. At 0.9 μm fabricating process, its surface examining technology will play an important role. Although it can use the method of reducing friction method which has mentioned above to the examining, but it would render the examining results imprecise due to the electrostatic or shift accuracy down by few friction. It's obvious that none-contacting force is a better way to solve the system problem above. Aerodynamic suspension system, electrostatic suspension system and maglev system are common examples which use none-contacting force. However, the first two are not suitable in some particular environment, e.g. clean room, vacuum room, etc. Therefore, in order to develop a positioning system with high accuracy and be able to use in many environments, a system which utilizes maglev theorem to be basic construction has been developed. Beyond the mature technologies of double axles maglev technology recently, Dr. Trumper, from MIT. USA, has published 6 DOF maglev positioning system which utilizes linear motors as basic construction that also provides vertical maglev and lateral impellent that the system needs at 1996. However, it is not easy to apply to relate industries for its complexity and difficulty.

Moreover, Dr. Trumper's student Kim, at Texas University, has designed a new 6 DOF micro-actuator which is still under developing. The system utilizes coils and permanent magnets to achieve 6 DOF motion. Although it is a high precision system, but it does not suit in large movement application for its hardware design. Kwang and Yoon, from Korea, have developed a construction that utilizes switching two dimensional electromagnet arrays and regulating current for rendering the platform moving on a plane. However, it still could not surmount the boundary problem between coils. On the other hand, it also means that it could not reach the large movement request.

Moreover, according to the disadvantage of the used maglev positioning systems, the inventor has invented a new planer maglev positioning system which could achieve large moving range and high 6 DOF moving accuracy.

SUMMARY OF THE INVENTION

A primary object of the present invention is to provide a novel planar maglev positioning system that has large moving range and the motion of 6degrees of freedom (DOF) with high accuracy positioning.

To achieve the above object, the novel planar maglev positioning system of the present invention mainly comprises: a platform, which has three hanging arms fixed on the platform, wherein each hanging arm has two permanent magnets, one being located at one end of the hanging arm and another one being located at a middle part of the hanging arm; three impelling sets which set outside of the permanent magnet located at the end of each hanging arm, and there are impelling coils setting on each impelling set; three maglev sets, which are set corresponding each hanging arms, and there are maglev coils and permanent magnets setting on each maglev set.

Due to the maglev force from the maglev coils which input controlling current, and impelling force from the impelling coils which input controlling currents, it could control the platform that enables to do 6 DOF position moving and achieve the large moving range and the motion of 6 DOF with high accuracy positioning.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
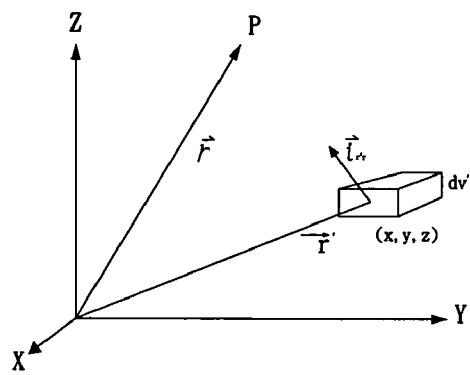
FIG. 1 is a magnetic field vector pattern which object generates in the space.
Figure 2:
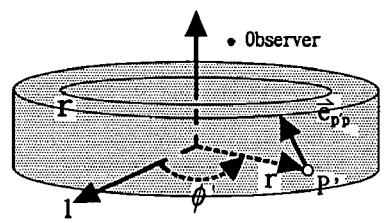
FIG. 2 is a magnetic field vector pattern which cylinder electromagnet generates in the space.

Please refer to FIG. 1 that is a magnetic field vector pattern which object generates in the space, and please refer to FIG. 2 that is a magnetic field vector pattern which cylinder electromagnet generates in the space, as shown:

According to Biot-Savart Law, the magnetic field vector which is generated in the space after connecting with current source is shown as:

$$\vec{H} = \frac{1}{4\pi}\int_{v'} \frac{\vec{J}(\vec{r'}) \times \vec{i}_{r'r}}{|r'-r|^2} dv' \quad (1)$$

Wherein $\vec{r}$ is a view point position vectors, $\vec{r}$ is a surface current position vector, $\vec{J}(\vec{r}^1)$ is the current density of the coil, $\vec{i}_{r'r}$ is a vector opposite of the view point and surface current. By applying the equation on the cylinder and rectangle electromagnets, we have got magnetic field vector in space as following equation:

$$\vec{H}_{cyl} = \frac{1}{4\pi}\int_{-h_1/2}^{h_1/2}\int_0^{2\pi}\int_{r_1}^{r_2} \left(\frac{NI_{cyl}}{(r_2-r_1)h_1}\right)\frac{(\vec{e}_{\phi'} \times \vec{e}_{p'p})}{|\vec{p}-\vec{p'}|^2} r' dr' d\phi' dz' \quad (2)$$

Wherein $h_1$ is coil's height, N is coil's winding turns $r_1$ and $r_2$ represent internal and external diameter of the coils, $I_{cyl}$ is an input current of the coil, $\vec{H}_{cyl}$ is product of position function and current in space.

We rewrite the equation as following:

$$\vec{H}_{cyl} = \vec{h}_{cyl}(x,y,z)I_{cyl} \quad (3)$$

Figure 3:
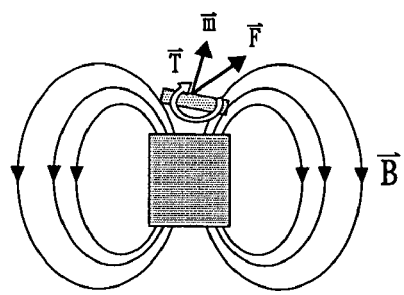
FIG. 3 is a permanent magnet forced pattern in magnetic field space.

With the same reason, we got the magnetic field that rectangular electromagnet generates is:

$$\vec{H}_{rec} = \vec{h}_{rec}(x,y,z)I_{rec} \quad (4)$$

please refer to FIG. 3 that is a permanent magnet forced pattern in magnetic field space. From Lorentz force, we got a equation of a permanent magnet forced in magnetic field space:

$$\vec{F} = (\vec{m} \cdot \nabla)\vec{B} \quad (5)$$

Wherein $\vec{m}$ is a dipole vector of the magnet.

From equation (3) and equation (4), it is not difficult to find that the magnet force that magnet generates in electromagnet field and can be shown as:

$$\vec{F} = \vec{g}(x,y,z)I \quad (6)$$

Wherein $\vec{g}(x,y,z)$ is a opposite position function of the magnetic in the electromagnet. In order to get the relating function of $\vec{g}(x,y,z)$, we avoid complicated theory or finite element method (FEM) to get the force of the magnet in the coil. We use high precision machine device to measure the force in the coil and rid of current value to get the curve of $\vec{g}(x,y,z)$.

Figure 4A:
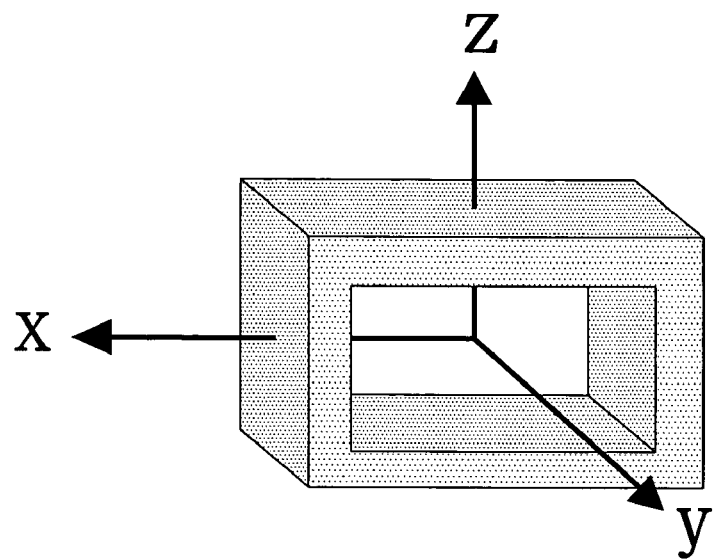
FIG. 4(a) is an aspect of a rectangle-shaped electromagnet.
Figure 4B:
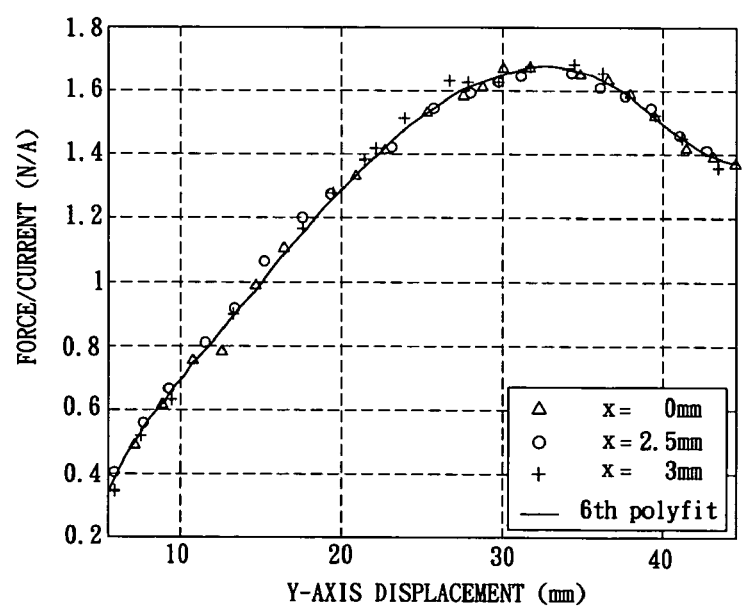
FIG. 4(b) is the forced curve between a rectangle-shaped magnet and a rectangle-shaped electromagnet.

Please refer to FIG. 4(a) and FIG. 4(b) that are the patterns of a rectangle-shaped electromagnet and the forced curve between a rectangle-shaped magnet and a rectangle-shaped electromagnet, as shown:

For rectangular magnet and rectangular electromagnet to be example, set 100 measuring points inside the coil and put the magnets on them, then get the force value of magnets in different current from those points, and utilize those measured data and multinomial curve to get:

$$F_{rec,y} = (a_6 y^6 + a_5 y^5 + a_4 y^4 + a_3 y^3 + a_2 y^2 + a_1 y + a_0)I_{rec} \quad (7)$$

Wherein $a_6 = -1.954 \times 10^9$, $a_5 = 4.39 \times 10^8$, $a_4 = -3.385 \times 10^7$, $a_3 = 1.16 \times 10^6$, $a_2 = -19338$, $a_1 = 214.8$, $a_0 = -0.385$. Therefore, we can get the relating function of $\vec{g}(x,y,z)$ between rectangular magnet and rectangular Electromagnet.

Figure 5A:
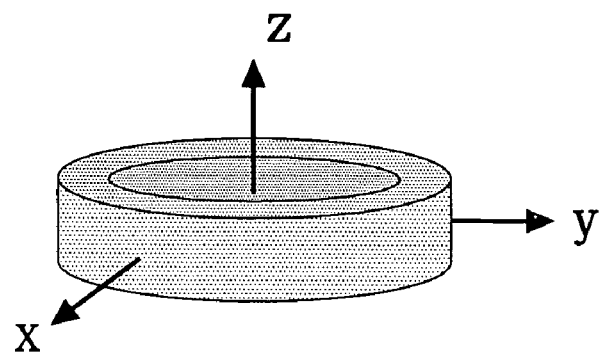
FIG. 5(a) is an aspect of a circular-shaped electromagnet.
Figure 5B:
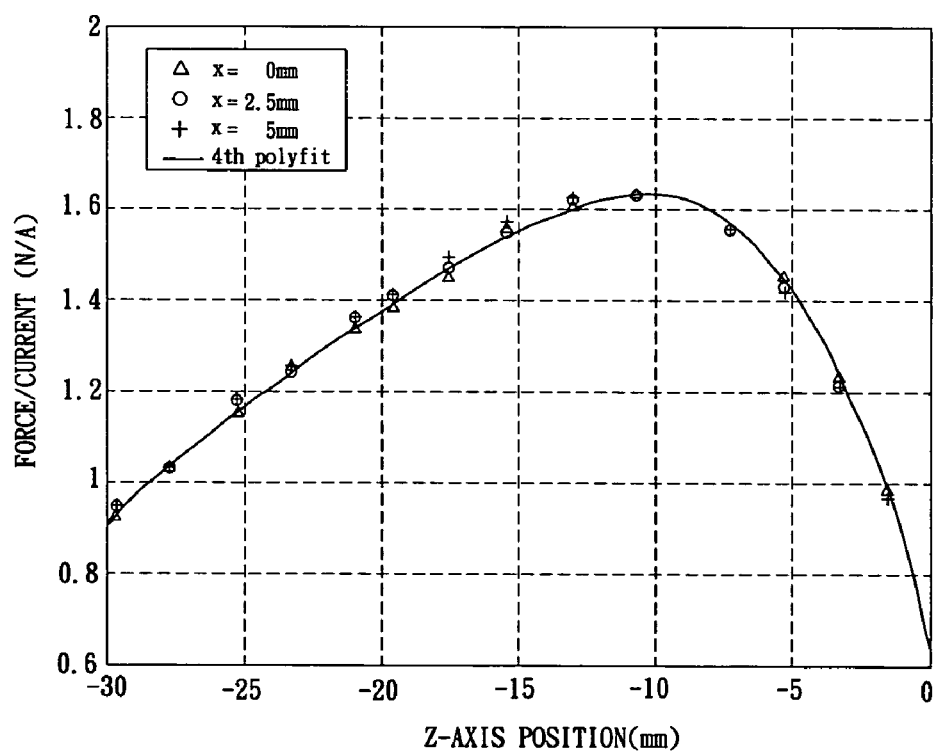
FIG. 5(b) is the forced curve between a cylinder-shaped magnet and a cylinder-shaped electromagnet.

Please refer to FIG. 5(a) and FIG. 5(b) that are the patterns of a circular-shaped electromagnet and the force curve between a cylinder-shaped magnet and a cylinder-shaped electromagnet, as shown:

Similarly, we get the relating function of $\vec{g}(x,y,z)$ between circular magnet and cylinder electromagnet by using the same way as above:

$$F_{cyl,z} = (b_4 z^4 + b_3 z^3 + b_2 z^2 + b_1 z + b_0)I_{cyl} \quad (8)$$

Wherein $b_4 = -5.62 \times 10^6$, $b_3 = -4.89 \times 10^5$, $b_2 = -16659$, $b_1 = -219.34$, $b_0 = 0.06619$.

Figure 6:
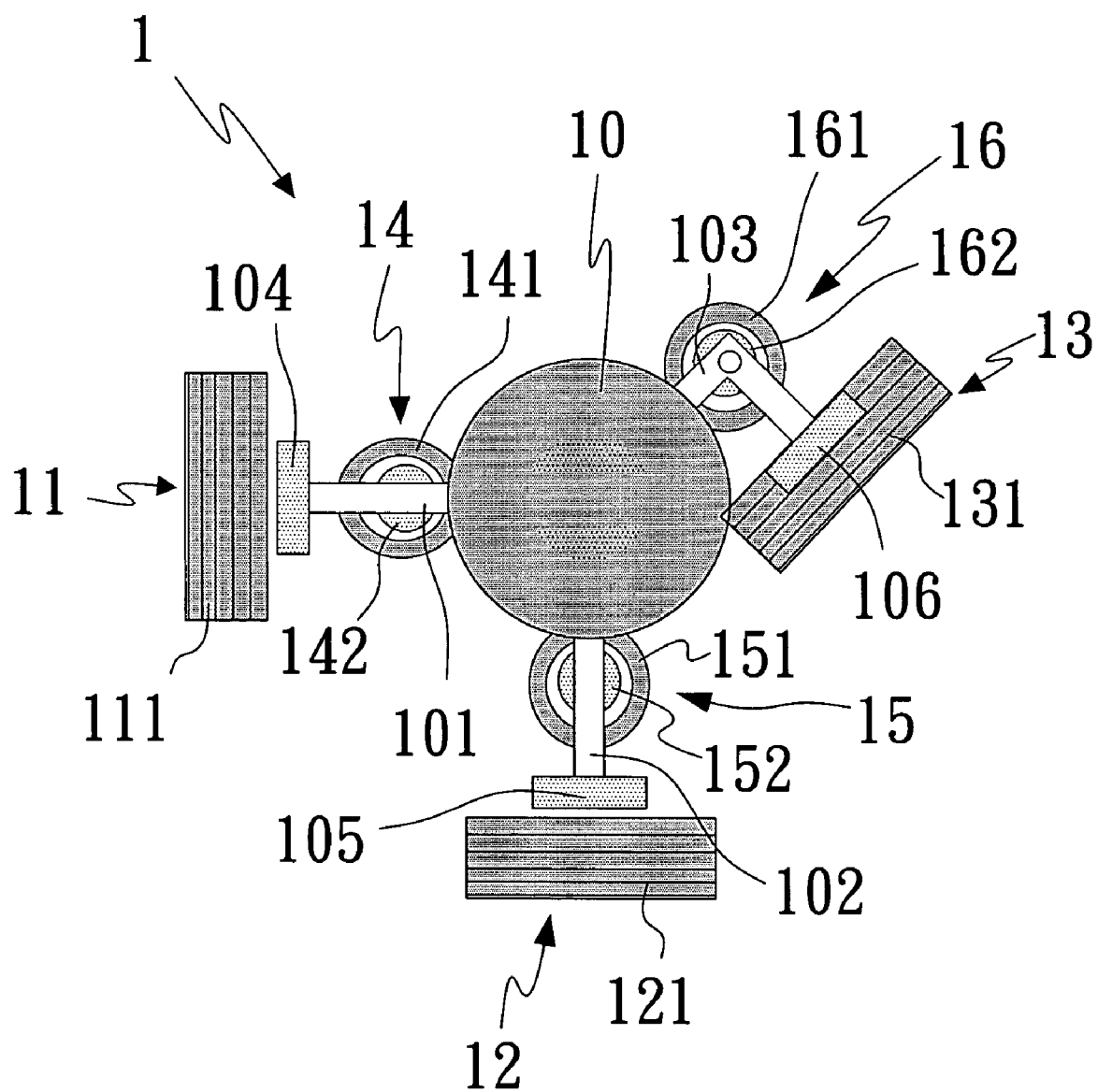
FIG. 6 that is the structure of the invention.

Please refer to FIG. 6 that is the structure of the invention, as shown:

The present invention, a novel planar maglev positioning system 1, comprises a platform 10, which has three hanging arms 101, 102, 103 at the edge, and each hanging arm 101, 102, 103 has set a permanent magnet 104 105 106 at the end; three impelling sets 11 12 13, which are set on the relative positions of the permanent magnets 104 105 106 located of the end of each hanging arms 101, 102, 103, and there are impelling coils 111 121 131 setting on each impelling sets 11 12 13 to provide impelling force when input control current into impelling coils 111 121 131 three maglev sets 14 15 16, which are set corresponding each hanging arms 101, 102, 103, and there are maglev coils 141 151 161 and permanent magnets 142 152 162 setting on each maglev set 14 15 16, to provide levitated forces when input control current into meglev coils 141 151 161. Wherein the material of the platform 10 and three hanging arms 101, 102, 103 and maglev coils 141, 151, 161 can be aluminum alloy, and these three hanging arms 101, 102, 103 can be "冂" shape strength structure. Besides, one of the three handing arms 101, 102, 103 can be bent shape.

Figure 7A:
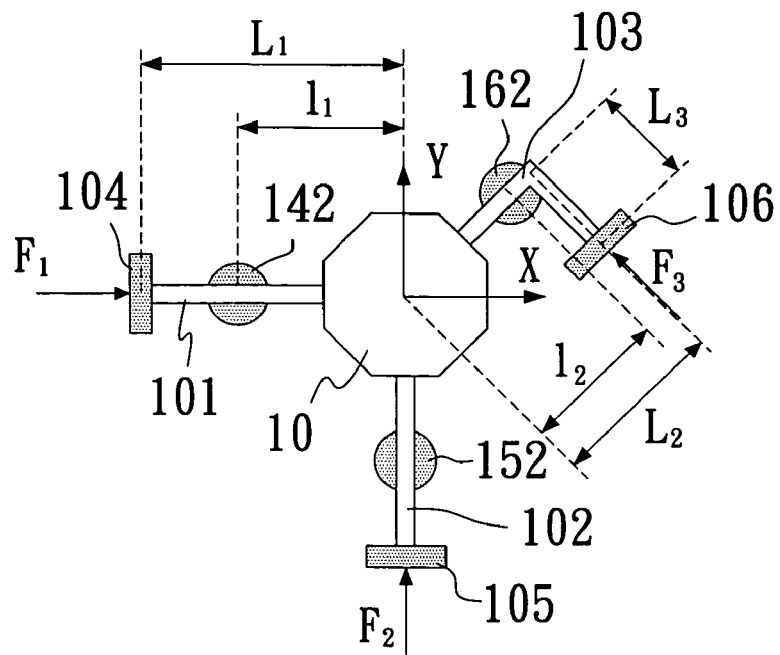
FIG. 7(a) is the overlook of the platform under force of the invention.
Figure 7B:
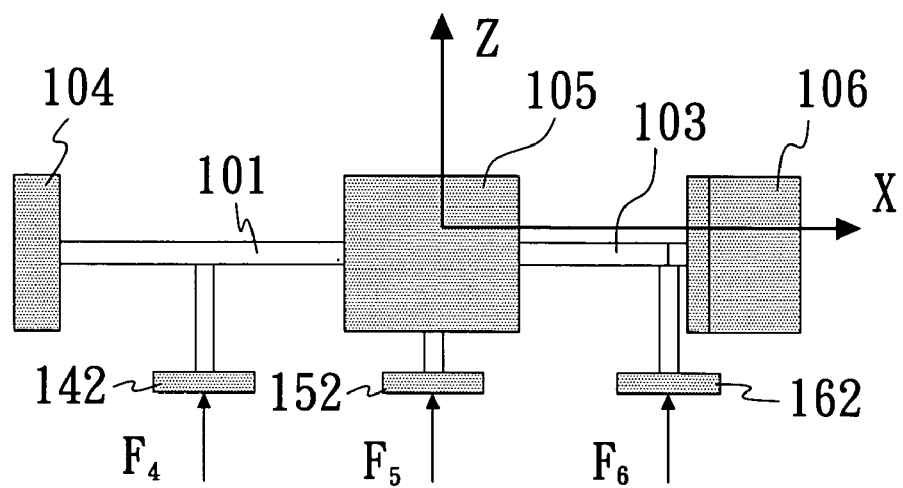
FIG. 7(b) is the front-look of the platform under force of the invention.

Please refer to FIG. 7(a) and FIG. 7(b) that are the overlook and front-look patterns of the platform under force of the invention, as shown:

By Newtonian second mechanics law, we get forced equations and torque equations of the platform from the six magnetic force of FIG. 7(a) and FIG. 7(b):

$$\Sigma F_X = F_1 - \sqrt{2}/2 F_3 = M\ddot{X}$$

$$\Sigma F_Y = F_2 + \sqrt{2}/2 F_3 = M\ddot{Y}$$

$$\Sigma F_Z = F_4 + F_5 + F_6 - Mg = M\ddot{Z}$$

$$\Sigma T_X = -F_5 l_1 + \sqrt{2}/2 F_6 l_2 \cong I_{XX}\ddot{\phi}$$

$$\Sigma T_Y = F_4 l_1 - \sqrt{2}/2 F_6 l_2 \cong I_{YY}\ddot{\phi}$$

$$\Sigma T_Z = F_3 L_3 \cong I_{ZZ}\ddot{\theta} \quad (9)$$

Wherein M is mass of the platform, g is acceleration of gravity, $I_{XX}$, $I_{YY}$ and $I_{ZZ}$ are rotating inertia of the platform along X, Y and Z axles. Go back to equation (7) and (8), we can rewrite the above matrix into:

$$\overline{M}\ddot{W}=B(W)U-G \qquad (10)$$

Wherein $\overline{M} \equiv \text{diag}[M, M, M, I_{XX}, I_{YY}, I_{ZZ}]$, $X \equiv [X, Y, Z, \phi, \phi, \theta]^T$, $U \equiv [u_1, u_2, u_3, u_4, u_5, u_6]^T$, $G \equiv [0, 0, Mg, 0, 0, 0]^T$.

From the equations above, utilizing impelling force $F_1$ $F_2$ $F_3$ when input control current into impelling coil 111 121 131 can precisely control the platform 10 moving along axle, and rotating along axle($\theta$), and utilizing meglev coils 141 151 161 to input control current to generate levitated forces $F_4$ $F_5$ $F_6$ can precisely control the platform 10 moving along axle and rotating along, axle($\phi$, $\psi$) utilizing maglev coils 141, 151, 161. Thus, it achieves large moving range and the motion of 6 DOF with high accuracy positioning.

What is claimed is:

1. A six-degree-of freedom magnetic levitation positioning system, comprising:

a levitated platform, including three arms extending radially outwardly from a center of the levitated platform;

six impelling coils disposed adjacent to the platform; and six permanent magnets attached to the platform such that each of the permanent magnets is adjacent to and magnetically aligned with a respective one of the impelling coils, wherein the impelling coils and permanent magnets are arranged into six sets in the system, three of the sets are maglev sets and another three of the sets are horizontal impelling sets, wherein one impelling set is positioned respectively at an end of every arm away from the platform, and every impelling set comprises a permanent magnet and one impelling coil, and one maglev set is located below every arm of the levitated platform at a point between the platform and the corresponding impelling set, and the impelling coils of the maglev sets are located slightly above the permanent magnets of the maglev sets, magnetic axes of the impelling coils of the maglev sets are generally vertically aligned, and magnetic axes of the impelling coils of the impelling sets are generally horizontally aligned; and whereby translation and rotations about a vertical axis of the platform are actuated by the three horizontal impelling sets.

2. The magnetic levitation positioning system according to claim 1, wherein one of the horizontal impelling sets has the magnetic axis of the impelling coil thereof directed generally away from a center of the platform, whereby the one of the horizontal impelling sets actuates the rotations around a vertical axis of the platform.

3. The magnetic levitation positioning system according to claim 1, wherein two of the impelling sets have the magnetic axes of the impelling coils thereof each being directed generally toward the center of the platform and being perpendicular to each other, whereby the two of the horizontal impelling sets actuate translation of the platform in two dimensions.

4. The magnetic levitation positioning system according to claim 1, wherein the impelling coil of each of the maglev sets is located on a same plane as the permanent magnet of the respective maglev set, whereby the impelling coils of the maglev sets are arranged in an equilateral-triangle position below the arms of the levitated platform.

* * * * *